April 26, 1960 H. P. KALMUS 2,934,756
APPARATUS RESPONSIVE TO CHANGES IN TRANSIT
TIME OF A WAVE-ENERGY SIGNAL
Filed June 1, 1956 3 Sheets-Sheet 1
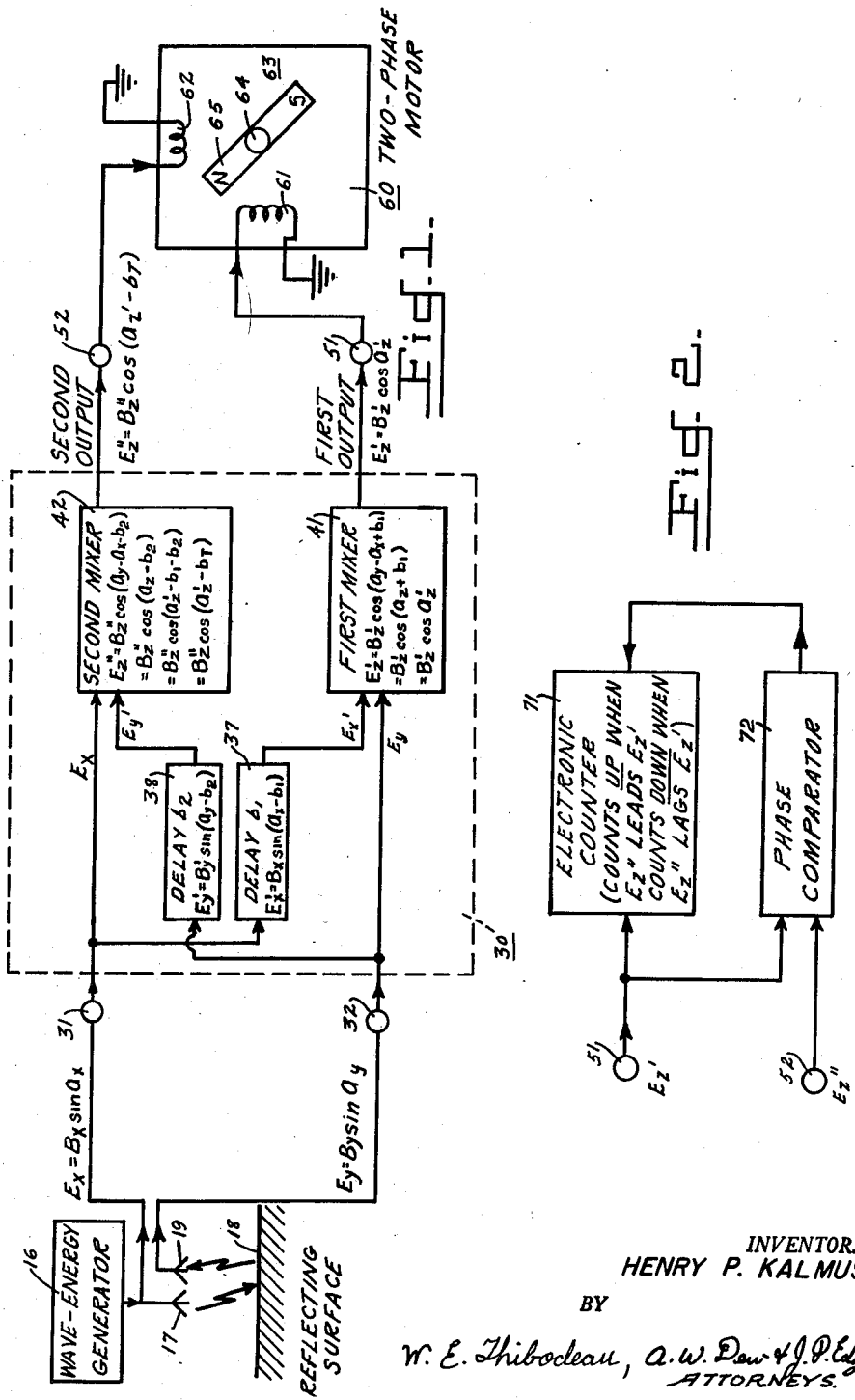
INVENTOR.
HENRY P. KALMUS
BY
W. E. Thibodeau, A. W. Dew & J. P. Edgerton
ATTORNEYS.

April 26, 1960  H. P. KALMUS  2,934,756
APPARATUS RESPONSIVE TO CHANGES IN TRANSIT
TIME OF A WAVE-ENERGY SIGNAL
Filed June 1, 1956  3 Sheets-Sheet 2

INVENTOR.
HENRY P. KALMUS
BY
W. E. Thibodeau, A. W. Dew & J. P. Edgerton
ATTORNEYS.

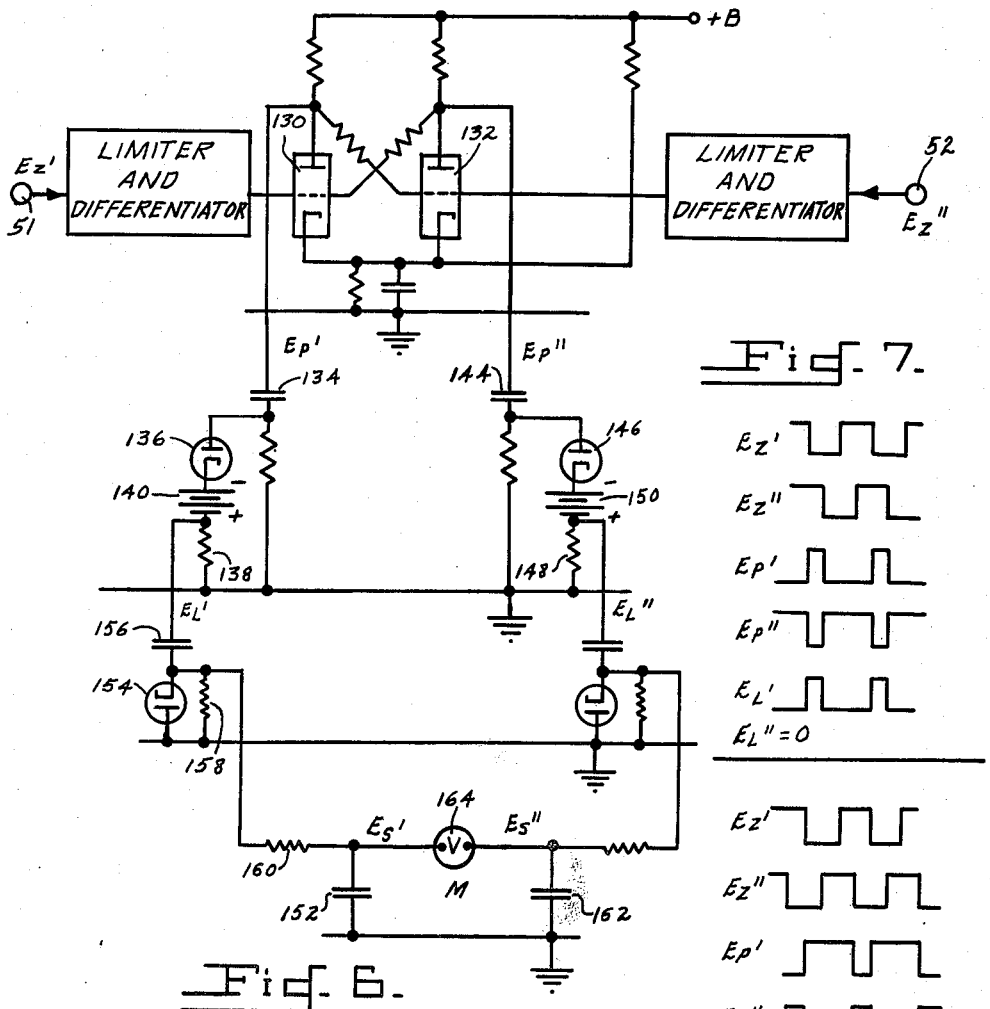

United States Patent Office 2,934,756
Patented Apr. 26, 1960

2,934,756

APPARATUS RESPONSIVE TO CHANGES IN TRANSIT TIME OF A WAVE-ENERGY SIGNAL

Henry P. Kalmus, Washington, D.C.

Application June 1, 1956, Serial No. 588,932

5 Claims. (Cl. 343—12)

(Granted under Title 35, U.S. Code (1952), sec. 266)

The invention described herein may be manufactured and used by or for the Government for governmental purposes without the payment to me of any royalty thereon.

This invention relates to apparatus responsive to changes in the transit time of a wave-energy signal travelling from a transmitter to a receiver.

In preferred forms of the invention a transmitter of constant-frequency wave energy, which may be either electromagnetic or acoustic, propagates energy through a transmission medium to a receiver. The phase of the received signal is compared with the phase of a local signal taken directly from the transmitter. If the transit time of the signal through the medium from transmitter to receiver remains constant, the phase of the received signal relative to the phase of the local signal remains constant. If this transit time changes, however, the phase of the received signal relative to that of the local signal increases or decreases by an amount that is a measure of the increase or decrease of the transit time, or of the path length in wavelengths. I provide various electromechanical or electronic means for obtaining a cumulative measure of such increases or decreases in transit time. If the initial transit time, or path length in wavelengths, is known, my measuring means provide a continuous or quasicontinuous measure of transit time, or of path length in wavelengths, closely following even very rapid changes. If the physical path length changes but the propagation velocity of the signal through the medium remains constant, a measure of physical path length is obtained. If the physical path length remains constant but the propagation velocity of the signal through the medium changes, a measure of the propagation velocity is obtained.

In certain important embodiments of the invention, radio signals are transmitted to a reflecting surface and a reflected signal is received by a receiver located at or adjacent to the transmitter; a measure of changes in the physical distance to the reflecting surface is obtained. If the initial physical distance is known, a continuous measure of the physical distance is obtained. In another important embodiment, sonic energy is transmitted through a gas to a remote receiver at a fixed physical distance from the transmitter; because the propagation velocity of sound through a gas is temperature-dependent, a measure of changes in the gas temperature is obtained.

In the scheme outlined above, let the phase angles of the local ($E_x$) and received ($E_y$) wave-energy signals be $a_x$ and $a_y$ respectively, these phase angles being considered to increase indefinitely with time, the rate of increase of $a_y$ being subject to variation dependent upon the relative motion between the transmitter and the reflecting surface. Let the phase difference between these signals be $$a_z = a_y - a_x$$

and let $a_z$ at a particular reference instant $t_0$ have the reference value $a_{z0}$. If subsequent to $t_0$, $a_x$ and $a_y$ do not both continue to increase at the same rate, the value of $a_z$ will deviate from $a_{z0}$. Let this deviation be called $\Delta a_z$; i.e., $\Delta a_z = a_z - a_{z0}$. My invention entails the continuous or quasicontinuous measurement of $\Delta a_z$.

Preferred embodiments of the invention entail (a) delaying a portion of the local, or $E_x$, signal by a small angle $b$, preferably about 90 degrees, to obtain a delayed, or $E_x'$, first signal; (b) mixing the received, or $E_y$, signal with the $E_x$ signal to obtain a first difference-frequency, or $E_z'$, signal; (c) mixing the $E_y$ signal with the delayed, or $E_x'$, first signal to obtain a second difference-frequency, or $E_z''$, signal, and (d) using these $E_z'$ and $E_z''$ difference-frequency signals to drive a two-phase motor or an electronic equivalent thereof. With this arrangement, when $a_z$ is changing positivewise, the second difference-frequency signal leads the first difference-frequency signal and the motor rotates in the forward direction at the rate of one revolution for each increase of 360 degrees in the value of $a_z$; but when $a_z$ is changing negativewise the second difference-frequency signal lags the first difference-frequency signal and the motor rotates in the reverse direction at the rate of one revolution for each decrease of 360 degrees in the value of $a_z$. The net angular deviation of the position of the motor shaft from its position when $\Delta a_z = 0$ thus provides a continuous measure of the value of $\Delta a_z$, which may be permitted to vary positivewise and negativewise over an indefinitely large range.

An object of the invention is to provide methods and devices for the continuous and accurate measurement of changes in the transit time of a wave-energy signal travelling from a transmitter to a receiver.

An important object is to provide methods and devices for the continuous and accurate measurement of changes in distance between a first physical object and a second physical object.

Another object is to provide methods and devices for the continuous and accurate measurement of changes in the velocity of wave energy propagation through a medium separating two fixed physical objects.

Still another object is to provide an accurate thermometer adapted to respond quasi-continuously to changes in the temperature of a gas.

Other objects, aspects, uses, and advantages of the invention will become apparent from the following description and from the accompanying drawing, in which:

Figure 1 is a schematic and block diagram of an arrangement for the measurement of changes in the transit time of a fixed-frequency wave-energy signal that travels from a radiator to a reflecting surface and back to a receiver.

Figure 2 is a block diagram of an electronic equivalent of the two-phase motor 60 utilized in Figure 1.

Figure 6 is a schematic diagram of a specific electronic device for performing a function similar to that of the system shown in Figure 2.

Figure 7 illustrates the waveforms at various points in the circuit of Figure 6 when the first input signal $E_z'$ leads the second input signal $E_z''$ by 90 degrees.

Figure 8 illustrates the waveforms at various points in the circuit of Figure 6 when the first input signal $E_z'$ lags the second input signal $E_z''$ by 90 degrees.

Figure 3:
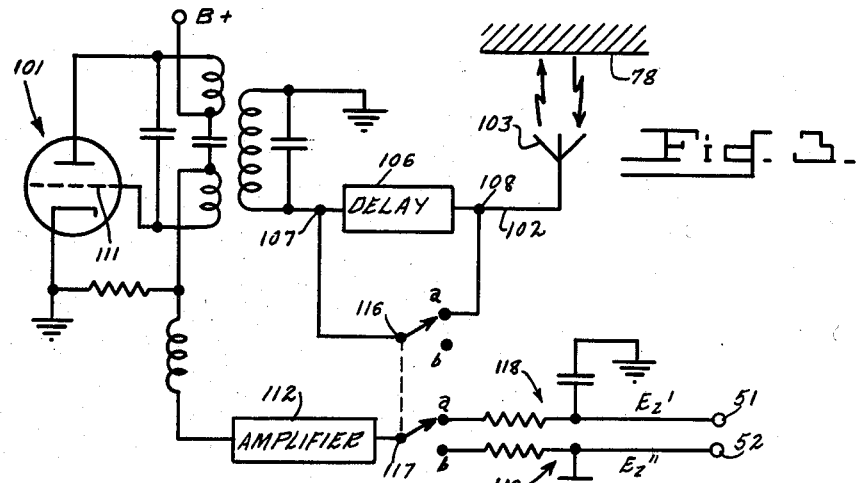
Figure 3 is a diagram of basic features of a radio-type distance-measuring form of the invention requiring only a single antenna for radiating a signal and for receiving a signal returned from a reflecting surface.

In Figure 1 a wave-energy generator 16 provides an audio- or radio-frequency electrical signal $E_x$ of constant frequency $f_0$ that is applied to a directional radiating device 17. Device 17 may be either a radiator of electromagnetic energy or a transducer that converts the $E_x$ electrical signal to an acoustic signal that is then radiated. A portion of the signal radiated by device 17 strikes a reflecting surface 18 and is returned to a receiving device 19. Devices 17 and 19 are preferably located in fixed relation to each other, and close to each other in relation to the distance to surface 18. It will be assumed for present purposes that the velocity of wave-energy propagation through the medium separating devices 17 and 19 from surface 18 is constant, but that the distance of devices 17 and 19 from surface 18 is subject to variation.

A local signal $E_x = B_x \sin a_x$ is taken directly from generator 16 and applied to a first input terminal 31 of a dual mixer network 30. The received signal $E_y = B_y \sin a_y$ is applied to a second input terminal 32. The frequency of generator 16 being constant, the phase angle $a_x$ increases at a constant rate and becomes indefinitely large with time. In the absence of motion of surface 18 relative to devices 17 and 19, the phase angle $a_y$ increases at the same rate as $a_x$ so that $a_z$ remains constant. If distance changes, however, the phase difference $a_z = a_y - a_x$ will also change. Following the notation already used above, let $a_{zo}$ be an initial or reference value of $a_z$ and let $\Delta a_z = a_z - a_{zo}$ be the deviation of $a_z$ from $a_{zo}$ at any particular instant. It will be seen that $\Delta a_z$ may become positive or negative and will be a measure of change in the initial or reference distance from devices 17 and 19 to surface 18.

Dual mixer network 30 comprises delay lines 37 and 38, a first mixer 41, and a second mixer 42. Delay line 37 delays by the angle $b_1$ a portion of the $E_x$ signal to produce a signal $E_x' = B_x' \sin(a_x - b_1)$. Delay line 38 similarly delays by the angle $b_2$ a portion of the $E_y$ signal to produce a signal $E_y' = B_y' \sin(a_y - b_2)$. Either $b_1$ or $b_2$, but not both, may be zero; in other words, one of the delay lines 37 or 38 may be omitted in certain embodiments of the invention. The total delay $b_T = b_1 + b_2$ is preferably an odd integral multiple of 90 degrees and should not be an integral multiple of 180 degrees.

The $E_x'$ and $E_y$ signals are mixed in a first mixer 41 to obtain a first difference-frequency output signal $E_z'$ having the phase angle $$a_z' = a_y - (a_x - b_1) = a_y - a_x + b_1 = a_z + b_1 = a_z'$$

The $E_x$ and $E_y'$ signals are mixed in a second mixer 42 to obtain a second difference-frequency output signal $E_z''$ having the phase angle $$a_z'' = (a_y - b_2) - a_x = a_y - a_x - b_2 = a_z - b_2$$
$$= a_z' - b_1 - b_2 = a_z' - b_T$$

where $b_T = b_1 + b_2$. The $E_z'$ and $E_z''$ signals thus have phase angles that change with time $t$ at the same $da_z/dt$ rate, that is, at the same electrical frequency, but the two signals differ in phase by a constant angle $b_T$ which is not zero or an integral multiple of 180 degrees and is preferably 90 degrees or an odd integral multiple thereof. It will be understood that this frequency is the well known Doppler frequency produced by relative motion between the transmitter and the reflective surface. When the effective distance therebetween is increasing the Doppler frequency is negative, but when the effective distance is decreasing the Doppler frequency is positive.

The $E_z'$ and $E_z''$ signals are applied to the terminals 51 and 52 of a two-phase motor 60. The signals from terminals 51 and 52 are applied to first and second motor windings 61 and 62 respectively; these windings create magnetic fields at right angles to each other with respect to rotor 63, which comprises a bar magnet 65 mounted fixedly on a rotatable shaft 64. Two-phase motors are well known. It is also well known (and can be shown mathematically) that if two signals differing in phase by a constant phase angle (such as the phase angles $a_z' + b_t$ and $a_z'$ of signals $E_z'$ and and $E_z''$, respectively) are applied to the windings of a two-phase motor, the motor will rotate in one direction when the time rate of change of each of the phase angles (that is, $da_z'/dt$) is positive, but will rotate in the other direction when the time rate of change of each of the phase angles is negative. This results because even though the phase difference between the two signals is constant, one signal will be leading the other signal by the constant phase angle $b_t$ when $da_z'/dt$ is positive, but will be lagging by the constant phase angle $b_t$ when $da_z'/dt$ is negative. It is further well known that the motor will turn at an angular velocity proportional to the time rate of change $da_z'/dt$ (which is also equal to $da_z/dt$ and $da_z/dt$), the rotor thereby making one rotation for every 360 degrees change in $a_z$.

It will therefore be understood, first, that the currents in windings 61 and 62 will define the position of rotor 63; second, that rotor 63 will rotate in response to changes in $a_z$ at the rate of 360 degrees of rotation for every 360 degrees change in $a_z$; third, that if, as I prefer, $b_T$ is made an integral multiple of 90 degrees, the angular change in the position $a_r$ of rotor 63 will conform closely to the angular change in $a_z$, degree for degree; fourth, that the direction of rotation of rotor 63 will depend on whether $a_z$ is changing positivewise or negativewise, that is, whether the Doppler frequency is positive or negative; and fifth, that if $a_z$ and $a_r$ have the reference values $a_{zo}$ and $a_{ro}$ respectively at a particular time $t_0$, at any subsequent time the deviation $\Delta a_r = a_r - a_{ro}$ will correspond to the deviation $\Delta a_z = a_z - a_{zo}$, regardless of whether $\Delta a_z$ is—for example—1 degree or 27,000,942 degrees. (The question of limits to response speed will be discussed below.)

It will be understood that revolution-counters of well known types may be connected to rotor 63 that will count upward when rotor 63 rotates positivewise and that will count downward when rotor 63 rotates negativewise, providing at all times a count of $\Delta a_r$, to the nearest revolution.

It will be understood that rotor 63 may be connected to various types of gearing to obtain various types of rotational or rectilinear mechanical displacement, the amplitude of such displacement being dependent upon the value of $\Delta a_z$. It will be understood that such arrangements will be readily adapted to a variety of indication and control applications where it is desired to have an indication or response that is dependent upon the value of $\Delta a_z$.

It will be understood that an electronic equivalent of two-phase motor 60 may be constructed. Such an electronic equivalent is shown in block form in Figure 2. (Another and more specific electronic equivalent is shown in Figures 6–8 and will be described below.) The signal $E_z$ from terminal 51 is applied to an electronic counter 71. Signals $E_z'$ from terminal 51 and $E_z''$ from terminal 52 are both applied to a phase comparator 72. Comparator 72 senses whether $E_z''$ lags or leads $E_z'$ and furnishes this information to counter 71. When $E_z''$ is leading, counter 71 counts in the up direction (count becoming more positive) at the rate of one count per cycle; when $E_z''$ is lagging $E_z'$, counter 71 counts down (count becoming less positive) at the same rate. The net change in the reading of counter 71 from its reading at the time $t_0$ when $a_z = a_{zo}$ is thus equal to $\Delta a_z$ to the nearest revolution.

An advantage of the electronic counting technique just described is that speed of response is not limited by mechanical inertia, as in the case of the mechanical two-phase motor. On the other hand, the inertia of the mechanical motor can be a definite advantage in some applications; the inertia of the motor has an effect analogous to that of a "high-Q" resonant circuit, so that the motor follows weak signals accurately even in the presence of considerable random noise or interference.

The invention is readily adapted to automatically maintaining the height of an aircraft at a desired height $D_0$ above the ground. When the arrangement of Figure 1 is adapted to aircraft use, reflecting surface 18 being the earth's surface, rotor 63 will be stationary when the aircraft is flying at the desired height. Deviations from the desired height will result in rotation of rotor 63, the direction of rotation depending on whether the height deviation is upward or downward, and this rotation can readily be applied to alter the position of appropriate airfoils to restore the aircraft to the desired height.

Alternatively, the invention is readily adapted to provide a highly accurate altimeter. Motor 60, or an electronic equivalent thereof, can be adapted to read directly in terms of height deviation from a reference height $D_0$. It will be understood that any desired elevation, including sea level, can be selected as the reference height $D_0$.

It will be understood that, with reference to Figure 1, rotor 63 will make one revolution for every change of one-half wavelength in the distance of radiator 77 and receptor 79 from surface 78. Accordingly, it will be understood that by designing generator 76 to provide energy of relatively high frequencies the sensitivity of motor 60 to changes in distance D can be improved. For example, by selecting a frequency of 1000 megacycles a radioaltimeter can be provided in accordance with the invention in which motor 63 will make a complete revolution for every 15 centimeters change in distance D. High accuracy can thus be achieved.

Alternatively, it will be understood that the angular response of motor 60 can be increased $n$-fold by using two identical frequency multipliers to multiply the frequencies of the $E_x$ and $E_y$ signals by the same constant $n$ before applying them to input terminals 31 and 32.

Figure 3 shows a distance-measuring arrangement that requires only a single antenna. In this arrangement a high-speed mechanical or electronic switching scheme is used to produce alternately, in quick succession, the $E_z'$ and $E_z''$ signals needed to drive a two-phase motor or equivalent in accordance with the invention.

In Figure 3 a triode vacuum tube 101 is connected in an oscillator circuit to generate energy of radio frequency. A portion of this energy is coupled to a feeder 102 that feeds an antenna 103. A delay network 106, preferably adapted to produce a delay of one-eighth wavelength, is interposed in delay line 102, between points 107 and 108. Energy returned to antenna 103 from a reflecting surface 78 is coupled back to grid 111 of oscillator tube 101. The diode action of grid 111 causes mixing of the returned signal with the local signal to produce a difference-frequency signal at grid 111 that is amplified by an amplifier 112.

A two-position switch 116 having an "a" position and a "b" position is synchronized with another two-position switch 117 also having an "a" position and a "b" position.

When switches 116 and 117 are in the "a" position, delay line 106 is shorted out and the signal from amplifier 112 is fed through a resistance-capacitance integrator 118 to a terminal 51 of a two-phase motor 60 (see Figure 1) or electronic equivalent.

When switches 116 and 117 are in the "b" position, delay line 106 is unshorted and the signal from amplifier 112 is applied—through another resistance-capacitance integrator 119 (which may be, and normally will be, of the same design and characteristics as integrator 118)— to terminal 52 of motor 60.

Synchronized switches 116 and 117 should preferably switch at a rate substantially higher than the maximum frequency that the $E_z'$ and $E_z''$ signals may be expected to attain as the result of relative motion between antenna 103 and reflecting surface 78.

Delay line 106 is preferably selected to introduce a 45-degree delay in each signal passing through it. It will be understood that the phase angle of the returned signal ($E_y'$) reaching grid 111 when switch 116 is in the "b" position will then lag by 90 degrees the returned signal ($E_y$) reaching grid 111 when switch 116 is in the "a" position. It will also be understood that the $E_z'$ signal applied to terminal 51 will differ in phase by 90 degrees from the $E_z''$ signal applied to terminal 52, and that the angular position of motor 60 or electronic equivalent will correspond to the deviation, with respect to a reference distance $D_0$, of the distance D of antenna 103 from surface 78.

Either mechanical or electronic switches may be used as switches 116 and 117. If electronic switching is used, it is advantageous to employ saturable ferrite reactors for delay line 106 and to change the delay time by applying a square wave to these reactors.

Figure 4:
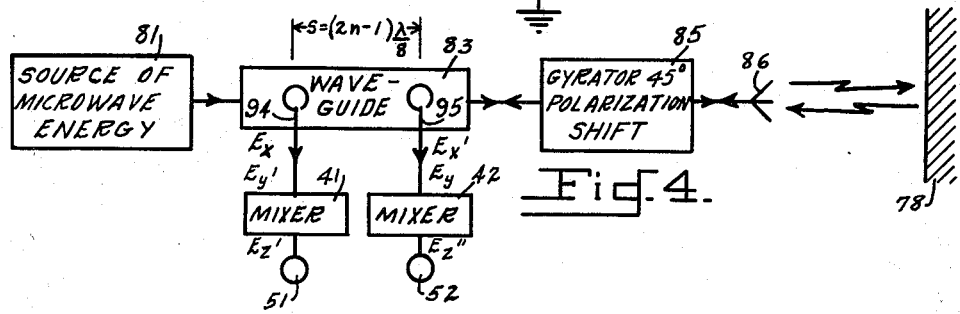
Figure 4 is a diagram showing basic features of a distance-measuring form of my invention using microwave energy and requiring only a single antenna.

Another useful distance-responsive form of the invention requiring only one antenna is shown in Figure 4. In Figure 4, a source of microwave energy 81, preferably a klystron, produces a horizontally polarized wave which passes through a round waveguide 83 with the $TE_{11}$ mode, through a gyrator 85, to a horn antenna 86.

The function of gyrator 85 is to produce a 45 degree rotation in the plane of polarization of a wave passing through it. Such gyrators are known. A preferred form of gyrator consists of a ferrite rod surrounded by a coil carrying direct current; the amount of rotation can be adjusted by adjusting the amplitude of the direct current.

The wave leaving waveguide 83 is thus rotated 45 degrees before being radiated by horn antenna 86. A portion of the radiated wave is returned to antenna 86 by a reflecting surface 78. Reflection at surface 86 entails a 180-degree rotation of the plane of polarization, so that the returned wave striking antenna 86 has a polarization of 225 degrees with respect to the original wave in waveguide 83. This returned wave passes through gyrator 85 and enters waveguide 83. In passing through gyrator 85 the returned wave is rotated 45 degrees. The returned wave travelling leftward in waveguide 83 thus has a polarization of 270 degrees—is vertical—with respect to the outbound wave travelling rightward in waveguide 83.

From locations 94 and 95 in waveguide 83, which locations are spaced longitudinally by an odd number of eighth wavelengths, I couple energy to mixers 41 and 42 respectively. Each mixer 41 or 42 receives freely both the outbound (horizontally polarized) and the returned (vertically polarized) signals at the particular location 94 or 95 with which the mixer is electrically associated. Difference-frequency output signals $E_z'$ and $E_z''$ are obtained from mixers 41 and 42 respectively and are applied to terminals 51 and 52 of a two-phase motor 60 (see Figure 1) or electronic equivalent thereof. It will be understood that the $E_z'$ and $E_z''$ signals will differ in phase by 90 degrees; that motor 60 will rotate with changes in the distance D of surface 78 from antenna 86, the direction of rotation depending on whether the distance is increasing or dicreasing; and that the net deviation of the position of rotor 63 from the value corresponding to $D=D_0$ will be a measure of the distance deviation from $D_0$.

Persons skilled in the microwave art will be able to effect the desired coupling of energy from locations 94 and 95 to mixers 41 and 42 respectively, using known techniques. I prefer to couple waveguide sections to appropriately positioned slots in waveguide 83 and to locate diodes of the semiconductor type in these sections to function as mixers 41 and 42.

Thus far I have described certain embodiments of my invention that are particularly adapted to the measurement of distance and to the provision of various kinds of automatic distance indication or control. In the distance-responsive embodiments described above, wave energy is transmitted from a first fixed location to a reflecting surface at a variable distance, and this reflecting surface returns some of the wave energy to a second location in fixed and close proximity to the first location. I have shown how to use the change in phase of the returned signal, that accompanies variation in distance of the reflecting surface, to provide a useful response that is a precise continuous or quasicontinuous linear function of deviation in distance from a reference distance. The invention also has useful applications in systems in which energy flows directly from a radiator to a receptor, without being reflected by a reflector. Furthermore, the invention can be adapted to the measurement of changes in velocity of propagation through a medium in a system in which the length of the signal transit path from radiator to receptor remains constant.

Figure 5:
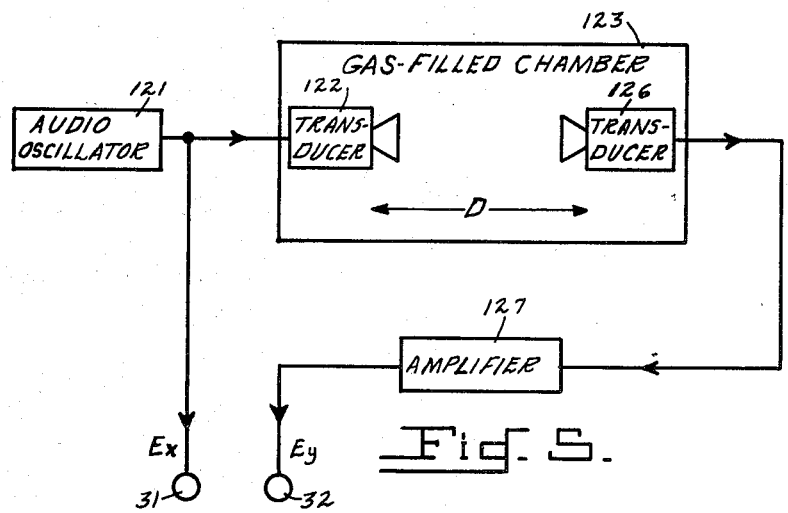
Figure 5 is a block diagram of basic features of a sonic thermometer in accordance with my invention; $E_x$ and $E_y$ signals are provided that may be applied to terminals 31 and 32 in Figure 1 to obtain a response proportional to temperature deviations.

Figure 5 shows a thermometer in accordance with my invention. In Figure 5, an audio oscillator 121 generates an electrical signal $E_x$ of sonic or supersonic frequency $f_x$ that is applied to a terminal 31 and that also drives an electroacoustical first transducer 122 mounted inside a gas-filled chamber 123. A portion of the acoustic energy from first transducer 122 is propagated through the gas within chamber 123 to a second transducer 126 located at a fixed distance D from first transducer 122. The electrical output signal $E_y$ from transducer 126 is amplified by an amplifier 127 and applied to a terminal 32.

When the temperature T of the gas in chamber 123 is at a fixed reference value $T_0$ the velocity of propagation of sound from transducer 122 to transducer 126 is constant, and the phase difference $a_z$ between the $E_x$ and $E_y$ signals has a fixed reference value $a_{z0}$. It will be understood that any change in the temperature of the gas will result in a change in the velocity of propagation and will cause $a_z$ to deviate from the reference value $a_{z0}$. It will also be understood that the deviation $\Delta a_z$ of $a_z$ from its reference value $a_{z0}$ can be measured by means of a dual mixer network (such as network 30 in Fig. 1) and a two-phase motor (motor 60 in Fig. 1) or electronic equivalent thereof (Fig. 2). The motor or equivalent can be calibrated in terms of temperature deviation from the reference temperature $T_0$ and, if $T_0$ is known, a continuous indication of rapidly fluctuating temperature can be provided. Direct indication of temperature in degrees centigrade or Fahrenheit is readily obtained. The system is readily adapted to temperature-recording, control, and computer applications. The inherent speed of response of this temperature-measuring system makes it particularly useful, for example, for the measurement of temperatures in an explosion chamber.

An electronic bidirectional phase comparator integrator for use in accordance with the invention was described above in connection with Figure 2. Figures 6, 7, and 8 illustrate a more specific form of such a device. In Figure 6 a first signal $E_z'$ supplied to a terminal 51 is limited, differentiated, and applied to the grid of a first triode 130 that is connected with another triode 132 in a well-known bistable flip-flop circuit. The output signal $E_p'$ from the plate of triode 130 is applied through a capacitor 134 to a biased diode 136. An output signal $E_L'$ is taken from a load resistor 138 in series with diode 136. The polarity of battery 140 that biases diode 136 is such that an output signal $E_L'$ is developed only in response to positive excursions of $E_p'$.

Similarly, the output signal $E_p''$ from the plate of triode 132 is applied through a capacitor 144 to another diode 146 biased by a battery 150; an output signal $E_L''$ is developed across load resistor 148 only in response to positive excursions of $E_p''$.

Upon consideration of Figures 6, 7, and 8 it will be understood that, if $E_z'$ leads $E_z''$ by 90 degrees, the $E_p'$ signal will be characterized by short positive excursions from a base value, and $E_L'$ pulses will be developed. The $E_p''$ signal, on the other hand, will be characterized by short negative excursions from a base value, and no $E_L''$ output will be developed. If $E_z'$ lags $E_z''$ by 90 degrees, however, the situation will be reversed; $E_L''$ pulses will be developed, but there will be no $E_L'$ output.

Means are provided for developing across a capacitor 152 a voltage $E_s'$ that increases in proportion to the total number of $E_L'$ pulses. These means consist of: a well-known cycle counter consisting of a diode 154, a capacitor 156, and a resistor 158; and an integrator consisting of a resistor 160 and capacitor 152 that integrates the voltage developed across resistor 158. Similar means are provided for developing across another capacitor 162 a voltage $E_s''$ that increases in proportion to the total number of $E_L''$ pulses. A high-resistance voltmeter 164 measures the difference $E_d$ in voltage between $E_s'$ and $E_s''$. Skilled persons will be able to optimize the circuit shown in order to obtain maximum linearity in the relation between the response of meter 164 and the difference between the cumulative total of cycles during which $E_z'$ leads $E_z''$ and the cumulative total of cycles during which $E_z'$ lags $E_z''$.

When I speak of "quasicontinuous" of "quasiproportional" response or indication or function in connection with my invention, I mean either the response or indication of two-phase motors having mechanical rotors (such as motor 60 in Fig. 1) or the response or indication of electronic or other equivalents of a two-phase motor (such as that shown in Fig. 2).

It will be apparent that the embodiments shown are only exemplary and that various modifications can be made in construction and arrangement with the scope of the invention as defined in the appended claims.

I claim:

1. In a system having means for transmitting and receiving wave energy, an instrument responsive to variations in the phase angle between the transmitted and received energy, said instrument comprising in combination: means for obtaining a first transmitted signal which is a sample of the transmitted energy, means for obtaining a first received signal which is a sample of the received energy, delay means for delaying by a constant phase angle one of said first transmitted and received signals with respect to the other of said signals thereby producing a second transmitted signal and a second received signal having the characteristic that one of said second signals has been delayed by a constant phase angle with respect to the other of said second signals, first mixer means to which one of said transmitted signals and one of said received signals are fed for deriving a first mixer output signal which is the difference beat frequency therebetween, second mixer means to which the other of said transmitted signals and the other of said received signals are fed for deriving a second mixer output signal which is the difference beat frequency therebetween, said first and second mixer output signals thereby having phase angles differing from one another by said constant phase angle so that the time rate of change of both phase angles of said mixer output signals is the same, and an indication device to which said first and second mixer output signals are fed, said device being so constructed and arranged that the application of said first and second mixer output signals thereto produces an indication which changes quasicontinuously at a rate proportional to said time rate of change and in one direction when said time rate of change is positive and in the other direction when said time rate of change is negative, said device thereby providing a quasicontinuous indication of the variations in the phase angle between the transmitted and received energy.

2. In a system having means for transmitting receiving wave energy, an instrument responsive to variations in the phase angle between the transmitted and received energy, said instrument comprising in combination: means for obtaining a first transmitted signal which is a sample of the transmitted energy, means for obtaining a received signal which is a sample of the received energy, delay means for delaying said first transmitted signal by a constant phase angle thereby producing a second transmitted signal having the characteristic of being delayed by said first transmitted signal by said constant phase angle, first mixer means to which said received signal and one of said transmitted signals are fed for deriving a first mixer output signal which is the difference beat frequency therebetween, second mixer means to which said received signal and the other of said transmitted signals are fed for deriving a second mixer output signal which is the difference beat frequency therebetween, said first and second mixer output signals thereby having phase angles differing from one another by said constant phase angle so that the time rate of change of both phase angles of said mixer output signals is the same, and an indication device to which said first and second mixer output signals are fed, said device being so constructed and arranged that the application of said first and second mixer output signals thereto produces an indication which changes quasicontinuously at a rate proportional to said time rate of change and in one direction when said time rate of change is positive and in the other direction when said time rate of change is negative, said device thereby providing a quasicontinuous indication of the variations in the phase angle between the transmitted and received energy.

3. The invention in accordance with claim 2 wherein said delay means is adapted to delay said first signal by a constant phase angle equal to a multiple of 90 degrees, and wherein said indication device is a two-phase motor having two windings at right angles to one another, said first mixer output signal being applied to one winding and said second mixer output signal being applied to the other winding.

4. The invention in accordance with claim 2 wherein said delay means is adapted to delay said first signal by a constant phase angle equal to a multiple of 90 degrees, and wherein said indication device is an electronic device comprising a phase comparator and an electronic counter.

5. A single antenna distance-measuring device comprising in combination: an oscillator circuit adapted to generate signal of radio frequency, said oscillator circuit including a triode vacuum tube having plate, grid and cathode elements connected for oscillator operation, an antenna for transmitting energy to a target and receiving reflected energy therefrom, a delay network adapted to produce a delay of one-eighth wavelength interposed between said antenna and the output of said oscillator, said oscillator being so constructed and arranged that the diode action of the grid of said triode causes mixing of the returned signal from the target and the signal generated by said oscillator producing a difference-frequency signal at said grid, an amplifier to which said difference-frequency signal is fed, first and second two-position switches adapted to switch at a predetermined rate, each of said switches having an "*a*" position and a "*b*" position, said switches being synchronized with one another so that both switches are always in the same position, said first switch being connected so that it shorts out said delay network when in the "*a*" position but leaves said delay network unshorted when in the "*b*" position, first and second resistance-capacitance integrators, said second switch being connected so that it connects the output of said amplifier to said first integrator when in the "*a*" position and to said second integrator when in said "*b*" position, and a two-phase motor having two windings at right angles to one another, the output of said first integrator being applied to one winding, and the output of said second integrator being applied to the other winding, said two-phase motor thereby providing a continuous indication of target distance.

References Cited in the file of this patent
UNITED STATES PATENTS

| | | |
|---|---|---|
| 2,517,549 | Earp | Aug. 8, 1950 |
| 2,705,320 | Palmer | Mar. 29, 1955 |